United States Patent [19]
Beall et al.

[11] Patent Number: 5,910,459
[45] Date of Patent: *Jun. 8, 1999

[54] GLASS-CERAMIC CONTAINING A STABILIZED HEXACELSIAN CRYSTAL STRUCTURE

[75] Inventors: George H. Beall, Big Flats; Hans J. Holland, Painted Post; Jeffrey T. Kohli, Corning, all of N.Y.

[73] Assignee: Corning Incorporated, Corning, N.Y.

[*] Notice: This patent is subject to a terminal disclaimer.

[21] Appl. No.: 08/742,611

[22] Filed: Oct. 28, 1996

Related U.S. Application Data

[60] Provisional application No. 60/008,149, Oct. 31, 1995, and provisional application No. 60/022,976, Aug. 2, 1996.

[51] Int. Cl.[6] ................................................. C03C 10/06
[52] U.S. Cl. .................................... 501/8; 501/69; 501/73
[58] Field of Search ...................................... 501/8, 69, 73

[56] References Cited

U.S. PATENT DOCUMENTS

| | | |
|---|---|---|
| 2,691,855 | 10/1954 | Armistead . |
| 2,920,971 | 1/1960 | Stookey . |
| 3,272,610 | 9/1966 | Eppler et al. . |
| 3,656,984 | 4/1972 | Hoffman ................................. 501/8 |
| 3,837,978 | 9/1974 | Busdiecker ............................. 501/8 |
| 3,953,220 | 4/1976 | Miller ..................................... 501/8 |
| 4,360,567 | 11/1982 | Guillevic . |
| 4,385,127 | 5/1983 | Chyung .................................. 501/8 |
| 4,971,932 | 11/1990 | Alpha et al. . |
| 5,476,821 | 12/1995 | Beall et al. . |

FOREIGN PATENT DOCUMENTS 402145473 6/1990 Japan .

OTHER PUBLICATIONS

Dov Bahat, "Compositional Study and Properties Characterization of Alkaline Earth Feldspar Glasses and Glass–Ceramics", published in vol. 4 (1969) of the *Journal of Materials Science,* pp. 855–860.

Jutta Topel–Schadt et al, "Transmission Electron Microscopy of $SrAl_2Si_2O_8$: Feldspar and Hexacelsian Polymorphs", published in vol. 13 (1978) of the *Journal of Materials Science,* pp. 1809–1815.

Yoshiki and Matsumoto, "High Temperature Modification of Barium Feldspar", published in vol. 34, No. 9 of the *Journal of the American Ceramic Society,* pp. 283–286 (1950).

*Primary Examiner*—Karl Group
*Attorney, Agent, or Firm*—Angela N. Nwaneri; Milton M. Peterson

[57] ABSTRACT

The glass-ceramic material of the present invention has the hexagonal sheet structure of hexacelsian as its primary crystal phase and exhibits x-ray diffraction patterns indicative of hexacelsian, said glass-ceramic material has a stabilized thermal expansion and an overall weight percent composition comprising: 35–55% $SiO_2$, 5–25% $Al_2O_3$, 5–25% MgO, 5–35% BaO, 6–14% $TiO_2$, 0–10% ZnO, and 0–8% $ZrO_2$.

7 Claims, 8 Drawing Sheets

GLASS-CERAMIC CONTAINING A STABILIZED HEXACELSIAN CRYSTAL STRUCTURE

This application claims the benefit of U. S. Provisional Application No. 60/008149 filed Oct. 31, 1995, entitled "Glass-Ceramic Containing a Stabilized Hexacelsian Crystal Structure", and provisional application No. 60/022976, Aug. 2, 1996.

FIELD OF THE INVENTION

This invention relates to glass-ceramics having a primary crystal phase with a hexagonal sheet structure similar to hexacelsian, and which exhibit a stabilized thermal expansion. Specifically, the glass-ceramics exhibit a primary crystal phase of hexacelsian and a secondary crystal phase of enstatite which is particularly suitable for use as a material for a magnetic memory disk substrate.

BACKGROUND OF THE INVENTION

Glass-ceramics have been utilized for over 30 years. U.S. Pat. No. 2,920,971 (Stookey) originally disclosed the preparation of glass-ceramics through the heat treating of precursor glass bodies. As explained therein, glass-ceramic articles are prepared in three general steps: (1) a glass-forming batch, normally containing a nucleating agent, is melted; (2) that melt is shaped into an article and cooled to a temperature below the transformation range of the glass; and (3) that glass article is heat treated at temperatures above the annealing point of the glass, and often above the softening point of the glass for a sufficient time to cause the glass to crystallize. The heat treatment can be scheduled so as to control the size and, in some instances, the identity of the crystals developed. Therefore, the crystal structures present in a glass-ceramic article can be the result of both the base chemical composition of the precursor glass and the heat treatment the glass body is subject to.

Glass-ceramics have been utilized in the manufacturing of such varied articles as cookware, tableware, missile nose cones, protective shields, and industrial applications. Recently, the utilization of glass-ceramics has expanded in the computer and electronics field. Currently glass-ceramics are being investigated for use as substrate materials in magnetic memory storage devices such as computer hard drive systems. Generally, a magnetic memory storage device consists of two fundamental units: a head pad and a rigid information disk. The head pad supports an element capable of reading/writing data magnetically on the information disk, while the information disk embodies two basic components, specifically a rigid substrate and a magnetic media coating on the surface of the rigid substrate.

Today's market for rigid magnetic storage is well established with advances foreseen through the use of thin film media technology. Increased information densities, higher disk rotation speeds, and lower head flying heights afford greater data storage and retrieval efficiencies and demand extremely tight tolerances in substrate specifications for flatness, rigidity at high rotational velocities, surface texture, and stabilized thermal expansion. Where the product is designed for the high performance market, high capacity and rapid access characteristics are key requirements. Current market trends toward smaller hard drives call for thin, lightweight, rugged disks that have high functional densities and are capable of withstanding multiple takeoffs and landings without deterioration of the magnetic media coating and the memory storage.

Recent research has led to the development of glass-ceramic materials suitable for use as substrates in magnetic memory devices. For example, U.S. Pat. No. 4,971,932 (Alpha et al.) discloses a rigid information disk, consisting essentially of a rigid substrate possessing a surface coating of magnetic media. That reference particularly describes two different types of glass-ceramic material suitable for use as the substrate material, those containing crystals having a chain silicate and those containing crystals having a sheet silicate as the predominant crystal phase.

Further, applicants' U. S. Pat. No. 5,476,821 (Beall et al), describes glass-ceramics having properties well suited for use as information disk substrates. These materials provide good fracture toughness and Knoop hardness values, a Young's modulus of $14-24 \times 10^6$ psi, and are capable of taking a fine polish. The ability to take a fine polish with a minimum amount of finishing time and effort is of very great importance in terms of the economics of producing an information disk. An information disk must have an ultra smooth surface upon which the magnetic media is coated to permit proper operation of the memory device. In order to produce an economically viable information disk, a glass-ceramic substrate material must be able to meet information disk requirements and qualifications with a minimum of finishing time and effort expended in the polishing and grinding of the information disk surface. It has been shown that the utility of many glass-ceramics as an information disk substrate is economically disadvantageous because of the increased cost in terms of man-hours, materials and efforts that are required to finish the surface.

It has also been found that glass and glass-ceramics used as information disk substrates should preferably be alkali-free. In the past it has been noted that the glass-ceramic should be free of alkali ions in that alkali ions present in a glass-ceramic substrate tend to degrade and interrupt the performance of the magnetic media coating that is placed on its surface.

As is preferred with glass-ceramics used in traditional articles it is also true with glass-ceramics used as information disk substrates that the glass-ceramic should have a stabilized thermal expansion over a wide range of temperatures. The utility and applicability of a glass-ceramic to a wide range of uses, environments, and articles of manufacture is greatly increased when the glass-ceramic has a stable thermal expansion which is exhibited by a thermal expansion curve free of points of inflection or flexion. The thermal expansion plot of a preferred glass-ceramic in which the change in dimension is plotted versus the temperature of the glass-ceramic is a straight line having no change in slope. Such a stabilized thermal expansion is very important in that glass-ceramic articles are normally exposed to a wide range of temperatures that can vary from below 0° C. to above 800° C. Such a stabilized thermal dimensional expansion allows for the use of such a glass-ceramic in a broader range of articles and allows for the glass-ceramic to be in contact with or bonded with other materials and substances throughout a viable temperature range. Further, a stabilized thermal expansion helps to prevent expansion cracking of the glass-ceramic. A glass-ceramic or ceramic with a non-stabilized thermal expansion is prone to complete structural failure. This prevents the use of it in applications where it would be subjected to thermal cycling, such as in refractory uses. Particularly with information disks, a stabilized thermal expansion allows for the preservation of the bond between glass-ceramic substrate surfaces and the magnetic media coating. Further, a stabilized thermal expansion allows for the proper mounting of the information disk on the center spindle which is normally made from a substance different than the information disk substrate. U.S. Pat. No. 5,028,567 (Gotoh et al.) describes the utility of a glass-ceramic which is substantially free of flexion in the thermal expansion curve.

Glass-ceramic articles containing hexacelsian have been discussed in the past as evidenced by U.S. Pat. No. 4,360,567 (Guillevic) and U.S. Pat. No. 3,272,610 (Eppler et al.). "Compositional Study and Properties Characterization of Alkaline Earth Feldspar Glasses and Glass-Ceramics" by Dov Bohat, published in Vol. 4 (1969) of the *Journal of Materials Science,* pp. 855–860 and "Transmission Electron Microscopy of $SrAl_2Si_2O_8$: Feldspar and hexacelsian polymorphs" by Jutta Topel-Schadt et al., published in Vol 13 (1978) of the *Journal of Materials Science,* pp 1809–1815 further disclose the hexacelsian crystal structure.

The broad application and use of hexacelsian glass-ceramics has been hindered by the instability of the thermal expansion behavior of hexacelsian. As discussed and shown in "High-Temperature Modification of Barium Feldspar", by Yoshiki and Matsumoto, published in Vol. 34, No. 9 of the *Journal of the American Ceramic Society,* pp. 283–286, hexacelsian (hexagonal crystal form of $BaO-Al_2O_3-2SiO_2$) experiences a discontinuous change in its thermal expansion at 300° C. As noted, such a drastic change must be considered when using hexacelsian in ceramic applications. This unstable jump or severe slope change in the thermal expansion of hexacelsian at approximately 300° C. is often referred to as a hook in the expansion curve. It has presented in the past a difficulty with the usefulness of hexacelsian crystals in a glass-ceramic or ceramic material. This hook in the hexacelsian thermal expansion normally makes the utilization of hexacelsian as a primary crystal in glass-ceramic information disk substrates difficult and often disadvantageous because of warping and structural failure.

Accordingly, it is the primary objective of the present invention to disclose a glass-ceramic article having a primary crystal phase with a hexagonal sheet structure characteristic of hexacelsian and having a stabilized thermal expansion.

SUMMARY OF THE INVENTION

The glass-ceramic material of the present invention has the hexagonal sheet structure of hexacelsian as its primary crystal phase and exhibits a x-ray diffraction pattern indicative of hexacelsian, has a stabilized thermal expansion and an overall weight percent composition comprising: 35–55% $SiO_2$, 5–25% $Al_2O_3$, 5–25% MgO, 5–35% BaO, 3–14% $TiO_2$, 0–10% ZnO. Optionally, $ZrO_2$ may be present in the composition in an amount in the range of up to 8.0 wt.%.

In another aspect, the invention relates to a glass-ceramic article having a primary crystal phase structure of hexacelsian and a secondary crystal phase structure of enstatite.

In a further aspect, the invention relates to a glass-ceramic having a primary crystal phase structure with a x-ray diffraction pattern indicative of hexacelsian and exhibits a stabilized thermal expansion.

In yet another aspect, the invention relates to a hexacelsian crystal structure in which Mg and/or Zn ions, as well as $Ti^{+3}$, $Ti^{+4}$ and/or $Zr^{+4}$ ions are substituted for at least some of the Ba and Al ions.

In another aspect, the invention relates to a method of stabilizing the thermal expansion of a hexacelsian glass-ceramic.

The stabilized thermal expansion hexacelsian glass-ceramic article of the invention is particularly suited for use as a information disk substrate.

DETAILED DESCRIPTION OF THE INVENTION

Figure 1:
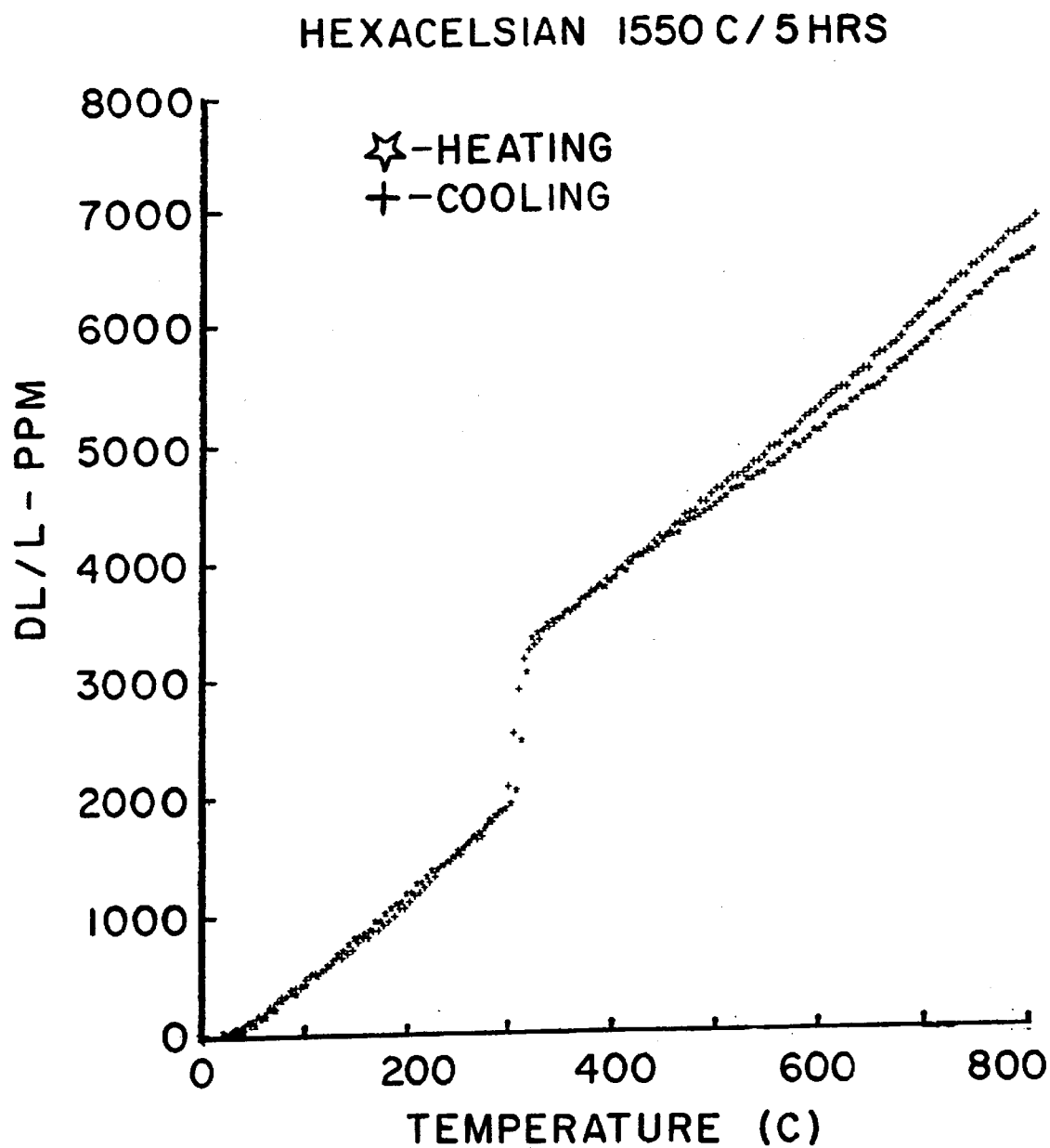
FIG. 1 illustrates the thermal expansion plot of a pure Hexacelsian ($BaO.Al_2O_3.2SiO_2$) sample heat treated at 1500° C. for 5 hours in order to produce a ceramic, with the y-axis giving the change in length divided by the original length of the sample in parts per million.

The present invention relates to the family of glass-ceramics that have been discovered in the broad system of $SiO_2-Al_2O_3-MgO-BaO-TiO_2$. This glass-ceramic family is based on the stabilized crystalline structure of hexacelsian ($BaO.Al_2O_3.2SiO_2$) and enstatite ($MgO.SiO_2$). Optional components of this family include minor levels of SrO, CaO and $B_2O_3$. The preferred nucleating agent of the invention is titania with a magnesium dititanate ($MgTi_2O_5$) nucleating crystal. Zirconia may be used as a less preferred nucleating agent in forming the glass-ceramic of this invention.

The general formation of glass-ceramic articles has been well known in the art for many years. The properties and characteristics of a glass-ceramic article are reliant on the composition of the precursor glass from which it is formed.

The composition of the precursor glasses and the subsequently formed glass-ceramics of this invention expressed in weight percent, comprise: 35–55% $SiO_2$, 5–25% $Al_2O_3$, 5–25% MgO, 5–35% BaO, 6–14% $TiO_2$, 0–8% $ZrO_2$, and 0–10% ZnO. In mole percent, the composition of the invention comprises: $SiO_2$ 40–60%, $Al_2O_3$ 5–15%, BaO 2–18%, MgO 10–35%, $TiO_2$ 5–12%, $ZrO_2$ 0–6%, and ZnO 0–8%. Optional ingredients CaO, SrO, and $B_2O_3$ should not exceed 15 wt % or 10 mole % in total. $TiO_2$ levels down to 5 mole % or 6 wt % can be used for coarser crystal structure applications such as dinnerware.

For information disk applications the preferred compositional ranges of the precursor glasses and the inventive glass-ceramics expressed in weight percent comprise: 40–50% $SiO_2$, 8–20% $Al_2O_3$, 10–24% MgO, 8–22% BaO, 8–14% $TiO_2$, and 0–5% ZnO. In mole percent the preferred information disk compositions of the invention comprise: $SiO_2$ 48–52%, $Al_2O_3$ 6–12%, BaO 4–11%, MgO 20–30%, $TiO_2$ 8–12%, ZnO 0–4%, and no more than a total of 5 mole % of the optional ingredients CaO, SrO, and $B_2O_3$. Also, low levels of the transition metal oxides and lanthanides may be added for coloration of the glass-ceramic or to vary thermal and mechanical properties. Alkali metal ions may be added to both the broad and preferred compositions but generally decrease durability and increase the propensity for contamination of magnetic films coated on the glass-ceramic.

In practicing this invention, a glass batch of the desired composition is formulated, mixed and melted. The glass melt is formed into a glass shape of a predetermined configuration utilizing conventional glass forming techniques. Once the glass shape is formed, it is heat treated in accordance with a pre-designed schedule to induce nucleation and growth of crystals on these nuclei. Thereafter, where necessary, the crystallized article is finished to precise dimensions and desired surface texture. The preferred nucleating agent is titania ($TiO_2$) with the nucleating crystal believed to be magnesium dititanate ($MgTi_2O_5$). It is generally known that zirconia ($ZrO_2$) may be used in place of titania as a nucleating agent. However, for the glass-ceramic article of the present invention, zirconia is less preferred as a nucleating agent. Thus, for a fine-grained glass ceramic structure, preferably, the $TiO_2$ is in the range of 8–14 wt. %. At titania levels below 8%, it may be necessary to include some $ZrO_2$ in order to obtain glass-ceramic articles having fine grain structure. Where the primary objective is to produce materials containing thermally stabilized hexacelsian, the $TiO_2$ can be present in an amount less than 6 wt. %.

The glass-ceramics of the invention can be formed from the parent glass using a variety of conventional techniques including pressing, spinning, and casting into large or small articles that are free from unwanted opalization and devitrification, even when cooled under relatively slow conditions. Glass batches representative of the above compositional ranges were melted at a temperature of about 1500–1600° C. for a duration of approximately 6–16 hours, resulting in transparent, brown glasses. Thereafter these precursor glasses were subjected to a ceramming heat treatment in which they were typically held at a temperature of 800° C. for approximately two hours to induce nucleation. Then, to promote the growth of crystals on these nuclei the temperature was raised up into the range of 925° C. to 1025° C. and held for approximately two to four hours.

These compositions and heating procedures result in crystallized glass articles having primary crystal phases with the hexagonal sheet structure indicative of hexacelsian. This crystallization is greater than 50% with an optimal crystallization percentage of 70% or greater.

The compositional ranges of Table I and Table II are a result of extensive investigations of the invention as disclosed in Tables III–VII. Table I discloses the compositional ranges of the invention in both weight % and mole % which are suitable for a wide range of glass-ceramic uses, articles and applications. Table II discloses the preferred compositional ranges of the invention which are particularly useful in the manufacturing of information disk substrates.

TABLE I

Composition Ranges of the Invention

|  | Weight % | Mole % |
| --- | --- | --- |
| $SiO_2$ | 35–55% | 40–60% |
| $Al_2O_3$ | 5–25% | 5–15% |
| MgO | 5–25% | 10–35% |
| BaO | 5–35% | 2–18% |
| $TiO_2$ | 6–14% | 5–12% |
| ZnO | 0–10% | 0–8% |
| Optional ingredients of CaO, SrO, $B_2O_3$, $ZrO_2$ in total % | 0–15% | 0–10% |

TABLE II

Preferred Composition Ranges of the Invention For Use as Information Disk Substrate

|  | Weight % | Mole % |
| --- | --- | --- |
| $SiO_2$ | 40–50% | 48–52% |
| $Al_2O_3$ | 8–20% | 6–12% |
| MgO | 10–24% | 20–30% |
| BaO | 8–22% | 4–11% |
| $TiO_2$ | 8–14% | 8–12% |
| ZnO | 0–5% | 0–4% |
| Optional ingredients of CaO, SrO, $B_2O_3$, $ZrO_2$ in total % | 0–10% | 0–5% |

Table III discloses the weight % of Samples A–M of this invention. These compositions are presented in approximate weight percent. Batches corresponding to Samples A–M were formulated using standard batch materials, and then melted at approximately 1500–1600° C. for approximately 6–16 hours. These glass melt compositions of Samples A–M resulted in transparent, brown glasses having compositions corresponding to their respective batch compositions. Table IV presents the compositional information of Table III's Samples A–M in mole percent.

TABLE III

Compositions by Weight % of Samples Melted at 1600° C. for 16 Hours (Resulting in Transparent Brown Glass)

| Wt % | A | B | C | D | E | F |
| --- | --- | --- | --- | --- | --- | --- |
| $SiO_2$ | 42.0 | 41.5 | 42.6 | 43.3 | 41.9 | 42.5 |
| $Al_2O_3$ | 14.2 | 18.3 | 14.5 | 14.7 | 14.2 | 14.4 |
| MgO | 11.3 | 10.0 | 12.0 | 12.8 | 11.3 | 11.4 |
| SrO | 0.0 | 0.0 | 0.0 | 0.0 | 0.0 | 2.0 |
| BaO | 21.4 | 19.1 | 19.6 | 17.7 | 21.4 | 17.4 |
| ZnO | 1.1 | 1.1 | 1.1 | 1.2 | 0.0 | 1.2 |
| $TiO_2$ | 10.0 | 10.0 | 10.2 | 10.3 | 11.2 | 10.2 |

| Wt % | G | H | I | J | K | L | M |
| --- | --- | --- | --- | --- | --- | --- | --- |
| $SiO_2$ | 34.9 | 39.7 | 43.2 | 46.3 | 46.0 | 48.0 | 45.2 |
| $Al_2O_3$ | 19.3 | 15.5 | 13.2 | 11.0 | 11.2 | 11.4 | 10.9 |
| MgO | 7.6 | 11.7 | 13.3 | 17.4 | 18.3 | 19.3 | 16.1 |
| SrO | 0.0 | 0.0 | 0.0 | 0.0 | 0.0 | 0.0 | 0.0 |
| BaO | 29.1 | 23.2 | 19.9 | 14.2 | 12.0 | 9.8 | 11.8 |
| ZnO | 0.0 | 0.0 | 0.0 | 0.0 | 1.3 | 0.0 | 5.0 |
| $TiO_2$ | 9.1 | 9.9 | 10.4 | 11.1 | 11.2 | 11.5 | 11.0 |

TABLE IV

Compositions by Mole % of Samples Melted at 1600° C. for 16 Hours
Resulting in Transparent Brown Glass

| Mole % | A | B | C | D | E | F | G | H | I | J | K | L | M | N | O | P |
|---|---|---|---|---|---|---|---|---|---|---|---|---|---|---|---|---|
| $SiO_2$ | 50.0 | 50.0 | 50.0 | 50.0 | 50.0 | 50.0 | 46.0 | 48.0 | 50.0 | 50.0 | 49.0 | 50.0 | 49.0 | 50.0 | 50.0 | 50.0 |
| $Al_2O_3$ | 10.0 | 13.0 | 10.0 | 10.0 | 10.0 | 10.0 | 15.0 | 11.0 | 9.0 | 7.0 | 7.0 | 7.0 | 7.0 | 10.0 | 10.0 | 10.0 |
| MgO | 20.0 | 18.0 | 21.0 | 22.0 | 20.0 | 20.0 | 15.0 | 21.0 | 23.0 | 28.0 | 29.0 | 30.0 | 26.0 | 20.0 | 20.0 | 20.0 |
| SrO | 0.0 | 0.0 | 0.0 | 0.0 | 0.0 | 2.0 | 0.0 | 0.0 | 0.0 | 0.0 | 0.0 | 0.0 | 0.0 | 0.0 | 0.0 | 0.0 |
| BaO | 10.0 | 9.0 | 9.0 | 8.0 | 10.0 | 8.0 | 15.0 | 1.0 | 9.0 | 6.0 | 5.0 | 4.0 | 5.0 | 10.0 | 10.0 | 10.0 |
| ZnO | 1.0 | 1.0 | 1.0 | 0.0 | 1.0 | 1.0 | 0.0 | 0.0 | 0.0 | 0.0 | 1.0 | 0.0 | 4.0 | 1.0 | 1.0 | 1.0 |
| $TiO_2$ | 9.0 | 9.0 | 9.0 | 9.0 | 10.0 | 9.0 | 9.0 | 9.0 | 9.0 | 9.0 | 9.0 | 9.0 | 9.0 | 8.0 | 6.0 | 3.0 |
| $ZrO_2$ | 0.0 | 0.0 | 0.0 | 0.0 | 0.0 | 0.0 | 0.0 | 0.0 | 0.0 | 0.0 | 0.0 | 0.0 | 0.0 | 1.0 | 3.0 | 6.0 |

Test pieces of glass Samples A–M were subjected to a ceramming heat treatment nucleation phase in which the test pieces were held at approximately 800° C. for approximately 2 hours. This nucleation phase allows for the creation of nuclei which will then promote subsequent crystal growth during the remaining ceramming heat treatment. The inventors believe that the nucleating crystal of the present invention is magnesium dititanate ($MgTi_2O_5$) when the preferred nucleating agent of titania is used. Subsequent to the nucleation phase, test pieces of Samples A–M were subjected to a four hour period in which crystal growth occurred at temperatures ranging from 925° C. to 1025° C. These ceramming heat treatment schedules are presented in Table V as Schedules 1–6. For example, Schedule 3 subjected the test pieces of glass to a nucleation phase of 800° C. for two hours and then a crystal growing phase of 1025° C. for 4 hours.

phases which may be exhibited by the inventive glass-ceramic. The stabilized hexacelsian crystal phase is the primary crystal phase in that it predominates over the secondary crystal phase of enstatite. Transmission electron micrographs reveal that the stabilized hexacelsian crystal phase comprises at least 40–50 vol % of the total crystalline content of the phase assemblage of Sample K.

The glass-ceramics of these various composition Samples A–M and ceramming Schedules 1–6 were carefully examined for their applicability as information disk substrates. Samples A, C, and E, cerammed under Schedule 1 (800° C.—2 hrs./925° C.—4 hrs.) and Sample K cerammed under Schedule 5 (800° C.—2 hrs./950° C.—4 hrs.) exhibited a fine microstructure and other characteristics particularly promising for use as information disk substrates. Since the information disk industry is moving toward smaller, thinner disk dimensions with ultra smooth surfaces allowing

TABLE V

Ceramming Process and Resulting Crystal Glass-Ceramic Phase and Appearance

| Schedule | Nucleation/Growth (°C.-hr/°C.-hr) | A | B | C | D | E | F | G | H |
|---|---|---|---|---|---|---|---|---|---|
| 1 | 800-2/925-4 | H/A-W | — | H/G-A | — | H/A | H/W-C | Cr-W | Cr-W |
| 2 | 800-2/975-4 | H/A-W | H/A-W | — | H/A | — | — | — | — |
| 3 | 800-2/1025-4 | H/W | H/W | — | H/A | — | — | Cr-W | Cr-C |

| Schedule | Nucleation/Growth (°C.-hr/°C.-hr) | I | J | K | L | M | N | O | P |
|---|---|---|---|---|---|---|---|---|---|
| 1 | 800-2/925-4 | H/A | H,E/G | H,E/G | — | — | — | — | — |
| 2 | 800-2/950-4 | — | — | H,E/G-A | — | H,E/G-A | H,LB,C | H,O,Wh,C | O,Wh,C |
| 3 | 800-2/975-4 | H/W | H,E/A-W | H,E/A-W | E/M/G | — | — | — | — |

Major Phase(s)/Appearance:
H = hexacelsian, E = enstatite, M = magnesium dititanate, O = other(s)
G = glassy, A = adamantine, W = waxy, Wh = white, C = cherty, Cr = cracked, LB = Lt. Blue Table V discloses the major crystal phases present in the glass-ceramics that resulted from subjecting glass Samples A–M to the various ceramming Schedules 1–6. Along with disclosing the resultant major crystal phases of hexacelsian, enstatite, and magnesium dititanate present in the various glass-ceramics Samples A–M, Table V also discloses the appearance of the glass-ceramic in terms of the characteristics of glassy, adamantine, waxy, cherty, or cracked. The term Major Phase(s) used in Table V indicates that the particularly listed crystal phases are present in a significantly greater amount than any of the other accessory crystal increased data storage capacity, glass-ceramic information disk substrates must demonstrate good strength, toughness, elastic modulus, hardness and thermal expansion, in addition to having a fine microstructure.

Tables VI and VII present the values of these properties for Samples A, C, E, K and M. The modulus of rupture of an abraded sample, fracture, toughness, elastic or Young's modulus, and coefficient of thermal expansion of these samples were measured and are shown in Tables VI and VII.

TABLE VI

Physical Properties of Selected Glass-Ceramics from Ceramming Process Schedule 1 (800-2/925-4)

|  | A | C | E |
|---|---|---|---|
| MOR Abraded (kpsi) | 12.2 | 10.1 | 11.5 |
| $K_{IC}$ (MPa · m$^{1/2}$) | 1.17 | 1.24 | — |
| Knoop Hardness (KHN) | 711 | 740 | 675 |
| Young's Modulus (E-modulus × 10$^6$ psi) | 16.2 | 17.3 | 15.8 |
| CTE × 10$^{-6}$/° C. (at 300° C.) | 7.9 | 7.8 | — |

TABLE VII

Physical Properties of Selected Glass-Ceramics from Ceramming Process Schedule 5 (800-2/950-4)

|  | K | M |
|---|---|---|
| MOR Abraded (kpsi) | 13.8 | 10.8 |
| $K_{IC}$ (MPa · m$^{1/2}$) | 1.4 | 1.3 |
| Knoop Hardness (KHN) | 783 | — |
| Young's Modulus (E-modulus × 10$^6$ psi) | 18.3 | 17.1 |
| CTE × 10$^{-6}$/° C. (at 300° C.) | 8.4 | 80.4 |

Figure 2:
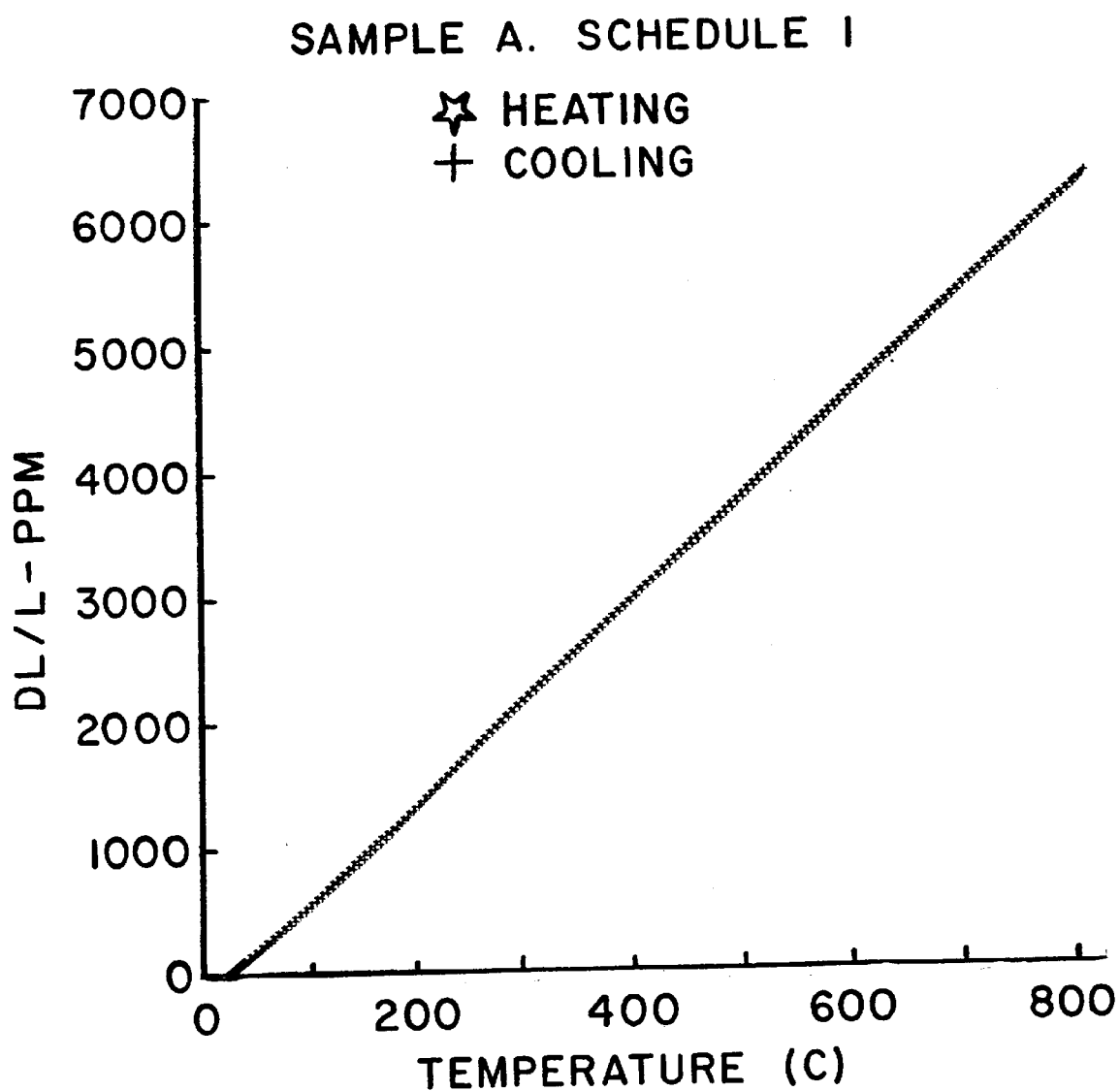
FIG. 2 discloses the thermal expansion plot of Sample A which was cerammed with Schedule 1.
Figure 3:
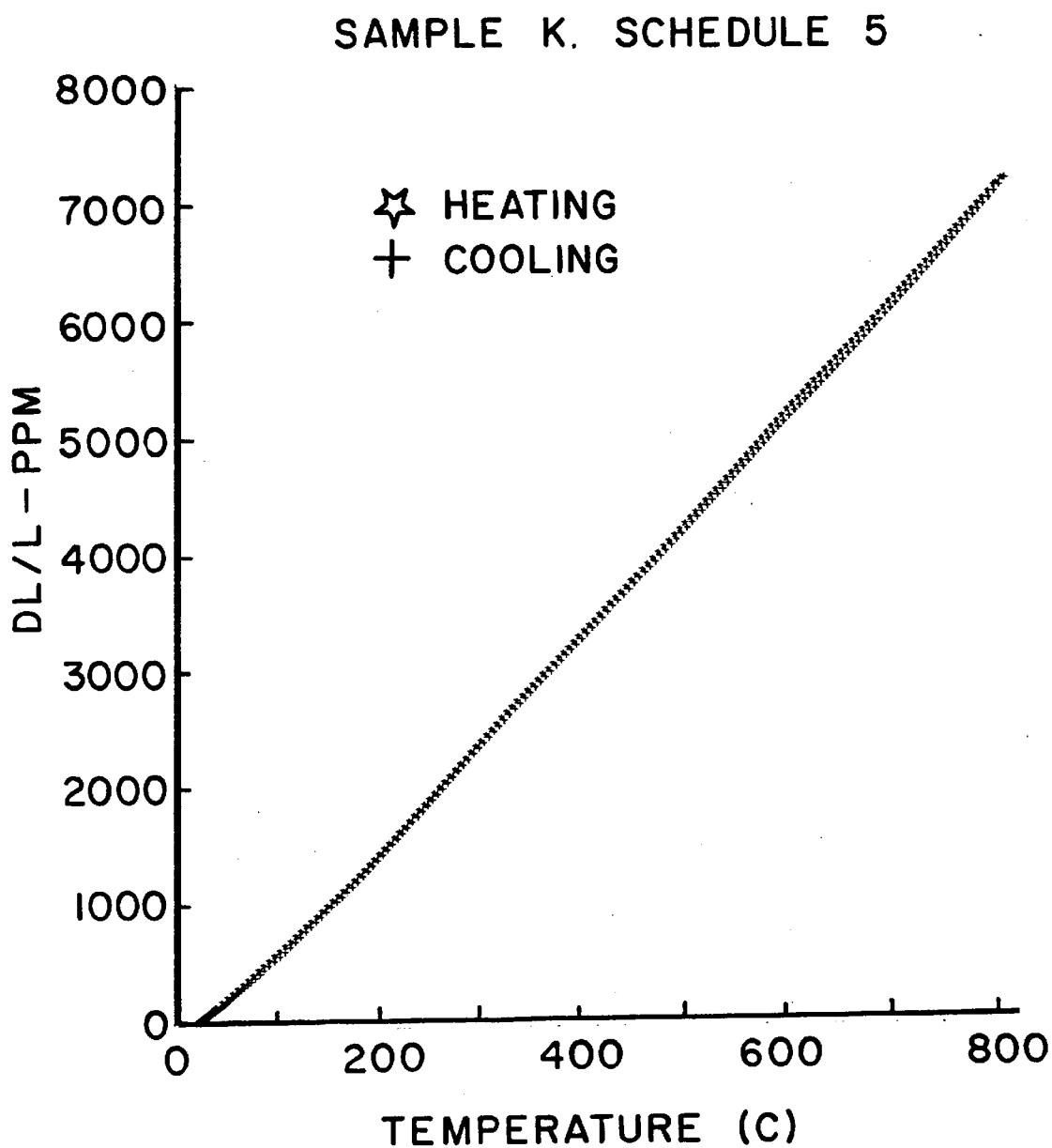
FIG. 3 shows the thermal expansion plot of Sample K which was cerammed with Schedule 5.

The stabilized thermal expansion of the present invention has many advantages and uses both in the information disk substrate industry and in other glass-ceramic applications. Through applicants' work on the present invention, unexpected and substantially improved results in terms of the hexacelsian glass-ceramic having a stabilized thermal expansion exhibited by a straight thermal expansion plot of change in length vs. change in temperature is disclosed. The thermal expansion plots as illustrated in FIG. 1–4 illustrate applicants' improved stabilized thermal expansion which is unexpected for hexacelsian ceramic or glass-ceramic material. The thermal expansion plots of FIG. 1–4 resulted from length-wise studies of the samples done on a Dual Push Rod Dilatometer manufactured by Theta Industries, Inc. of New York, N.Y. The thermal expansion curve for pure hexacelsian (BaO.Al$_2$O$_3$.2SiO$_2$) is shown in FIG. 1. FIG. 2 shows the stabilized thermal expansion plot of Sample A, Schedule 1 of the invention. FIG. 3 shows the thermal expansion plot for Sample K, Schedule 5 of the invention. A comparison of FIGS. 2 and 3 to FIG. 1 shows applicants' unexpected and improved stabilized thermal expansion. The thermal expansion plots of FIGS. 2 and 3 are free of flexion or points of inflection. FIGS. 2 and 3 do not have a severe slope change or hook in the expansion curve at 300° C. which is observed in the pure hexacelsian materials of FIG. 1. Applicants' invention, which has a primary crystal phase structure of hexacelsian, exhibits a thermal expansion curve which is free of the drastic hook exhibited in the thermal expansion of hexacelsian and which is well known to be characteristic of hexacelsian as shown in FIG. 1 and also disclosed in "High-Temperature Modification of Barium Feldspar", by Yoshiki and Matsumoto, published in Vol. 34, No. 9 of the *Journal of the American Ceramic Society*, pp. 283–286. This publication notes the drastic hook in thermal expansion and contraction curves of hexacelsian while comparing hexacelsian with celsian. Without intending to be bound by theory, we believe that the stabilized thermal expansion of the invention is due, at least in part, to a chemical substitution wherein Al ions and/or Ba ions in the hexacelsian structure are replaced by Mg ions and/or Zn ions. The compositional ranges of MgO, ZnO, Al$_2$O$_3$ BaO, ZrO$_2$, and TiO$_2$ in the inventive glass-ceramics allow for such a chemical substitution. The use of TiO$_2$ as an additive is apparently important in both stabilizing the hexacelsian crystal structure and in the development of a fine crystalline phase assemblage.

X-ray diffraction shows that when Mg and/or Zn is added to the bulk composition, the diffraction pattern indicates a hexagonal crystal structure representative of hexacelsian, but the dimensions of crystal unit cell are slightly altered providing what is believed to be a stabilization of the thermal expansion behavior relative to pure hexacelsian (BaO.Al$_2$O$_3$.2SiO$_2$). Excessive levels of zinc leads to the formation of other crystalline phases, including zinc aluminosilicates and gahnite.

The primary crystal phase of the invention is hexacelsian and/or hexacelsian-like in that it has a crystalline structure of a hexagonal sheet indicative of hexacelsian. However, the chemical composition of this hexacelsian-like crystal may be a variation of or deviation from the chemical composition of pure hexacelsian (BaO.Al$_2$O$_3$.2SiO$_2$), as discussed above, and can be referred to as a hexacelsian solid solution.

This stabilized thermal expansion may also be due in part to the presence of the secondary crystal phase of enstatite in addition to the primary crystal phase of hexacelsian.

Figure 4:
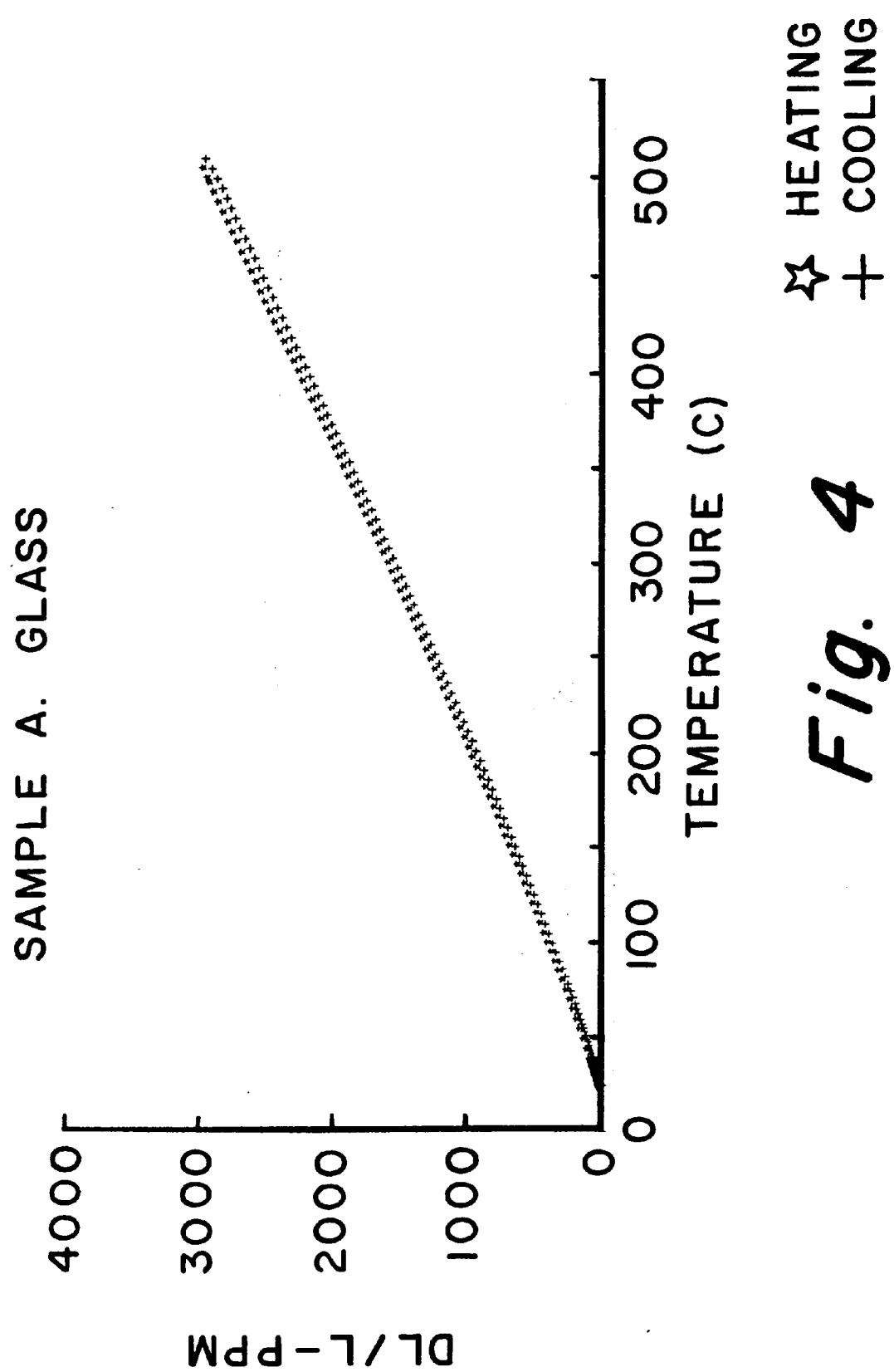
FIG. 4 illustrates the thermal expansion plot of uncerammed glass Sample A.

Applicants note that Sample A shown in FIG. 2 has substantially no enstatite crystals or a very minimal amount thereof, but displays a stabilized thermal expansion as illustrated by the straight line thermal expansion plot which is free of flexion and hooks. It is believed that the stabilized thermal expansion is mainly, if not totally, due to the applicants' composition resulting in the substituted hexacelsian structure, and not the presence of the secondary enstatite crystals. FIG. 3 illustrates the stabilized thermal expansion of Sample K which is identified in Table 5 as having a primary crystal phase of hexacelsian with a secondary crystal phase of enstatite. FIG. 4 shows the thermal expansion plot of Sample A glass that has not been cerammed, so it is still a glass and not a glass-ceramic.

Figure 5:
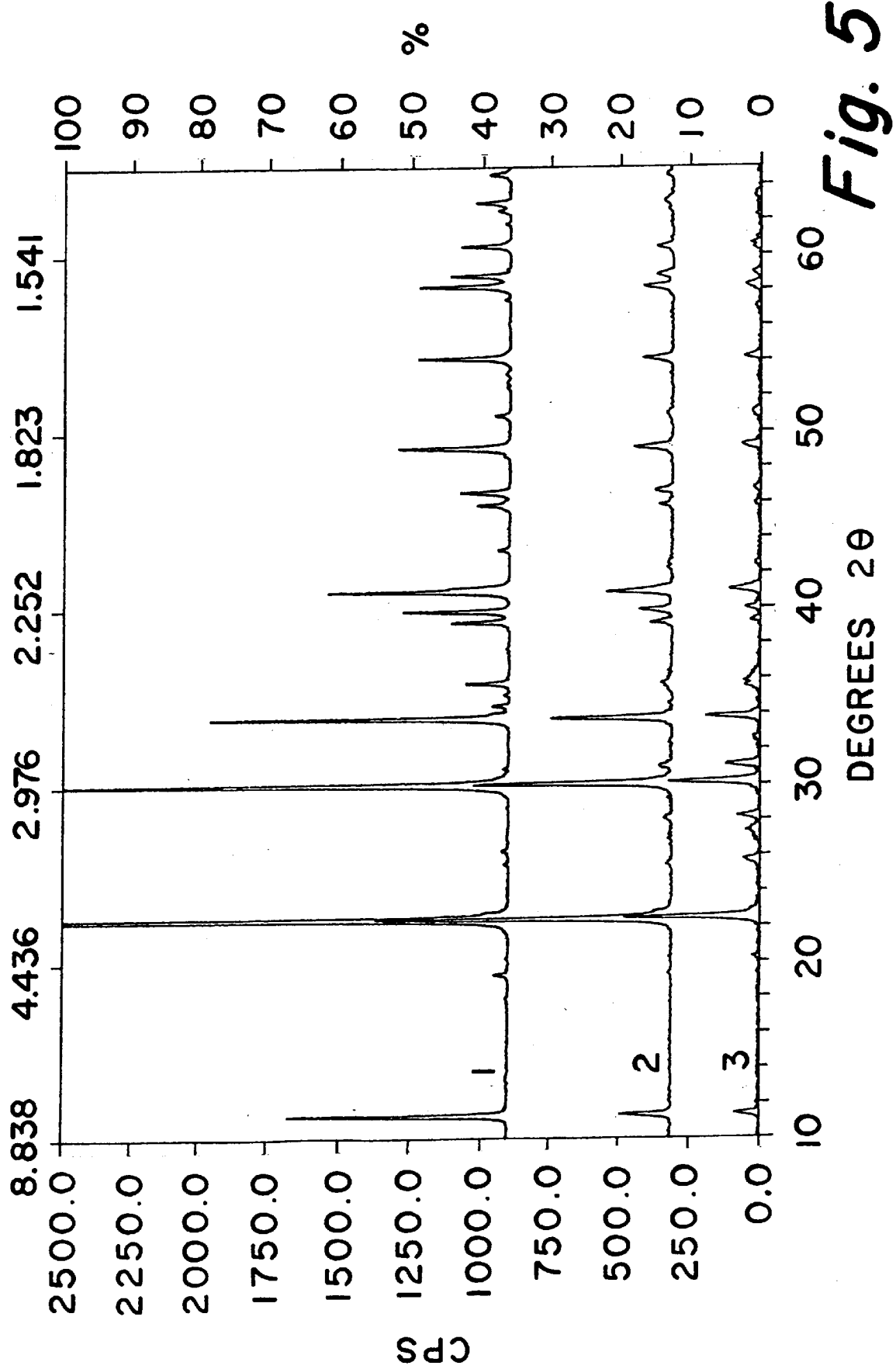
FIG. 5 discloses the x-ray diffraction pattern of two Samples of the invention (2,3) compared to a pure Hexacelsian sample (1) with the left Y-axis in counts per second, the right Y-axis in relative intensity %, the upper X-axis giving d spacings, and the lower x-axis giving degrees 2θ.

FIG. 5 compares the X-ray diffraction patterns of two samples of applicants' invention with a pure hexacelsian sample (BaO.Al$_2$O$_3$.2SiO$_2$) prepared with a standard ceramic heat treatment schedule of 5 hours at 1500° C. These x-ray diffraction patterns resulted from x-ray diffraction studies performed on an XRD System Model "PTS" manufactured by Scintag Inc., of Sunnyvale, Calif.

Upper diffraction pattern (1) shows the x-ray diffraction pattern of a pure hexacelsian sample prepared by the applicants and corresponds with x-ray diffraction data submitted to and published by the Joint Committee of Powder Diffraction Standards (JCPDS). The middle diffraction pattern (2) of Sample A, Schedule 1 and the lower diffraction pattern (3) of Sample K, Schedule 5 show that the glass-ceramic of the invention has the same crystalline structure as hexacelsian with a solid solution (ionic substitution) indicated by the minor shift in the 22 degrees 2θ diffraction line (peak) at approximately 22 degrees 2θ. Lower diffraction pattern (3) also discloses the presence of enstatite and magnesium dititanate. Middle diffraction pattern (2) exhibits a very minimal presence, if at all, of these enstatite and magnesium dititanate crystals.

The composition of applicants' invention has the advantage of a low preparation temperature in comparison to the preparation temperature of a dense hexacelsian ceramic resulting from the high temperature reaction of oxides, carbonates or other materials containing BaO, Al$_2$O$_3$, and SiO$_2$. Applicants' invention also has a relatively low preparation temperature in comparison to the preparation temperature of a pure hexacelsian glass-ceramic formed as a result of a secondary heat treatment of a glass article prepared from a high temperature melt exceeding 1600° C. These lower preparation temperatures are achieved with the use of magnesium dititanate ($MgTi_2O_5$) as the nucleating crystal because it is quite soluble and appears as the first crystal in the 800° C. range, after which it becomes a substrate for subsequent crystal growth. The presence of MgO in the glass-forming melt also serves to flux the melt and thereby lower the temperature at which one can create a glass which is free of solid or gaseous inclusions. In addition, the ZnO concentration of the invention can be adjusted to obtain favorable liquidus temperatures. For sample M, a 2 mole % ZnO resulted in a 1400° C. liquidus, a 3 mole % ZnO resulted in a 1320° C. liquidus, and a 4 mole % ZnO resulted in a 1300° C. liquidus. Such a favorable drop in the liquidus temperature is followed by an increase in liquidus temperature as the ZnO mole % is increased past the 5–6 mole % level.

The preferred embodiment and composition for use as information disk substrates has a fine microstructure consisting of sub-micron sized crystallites. Sample K of the invention exhibits such a microstructure with its average crystal size of 50–60 nm. This fine microstructure is ideal in an information disk substrate material for ultra-smooth magnetic memory disks. The secondary crystal phase of enstatite, and the primary crystal phase of hexacelsian is important for magnetic memory disk applications. The enstatite is particularly important in such applications. The secondary crystal phase of enstatite enhances both the strength and toughness of the glass-ceramic material as shown in Tables VI and VII, with Sample K being the preferred embodiment of the invention in terms of composition and characteristics. Incorporation of magnesium dititanate is believed to enhance the elastic modulus and hardness of the glass-ceramic. These improvements of strength and toughness of the preferred range are obtained while not increasing the grain size of the invention which is an essential requirement for ultra-smooth information disk substrates. Traditionally, when the strength and toughness of a glass-ceramic is increased grain size of the glass-ceramic is ordinarily increased to an optimal size range which may be larger than the grain size requirements for ultra-smooth information disk substrates. It is believed that the small percentage of ZnO of Sample K provides a surface texture preferred for information disk substrates. Compositions of the preferred range are appropriate for use in other applications where increased strength, toughness and hardness are needed. It should be noted that the time required to finish or lap the glass-ceramic increases with the increase of enstatite crystals.

Figure 6:
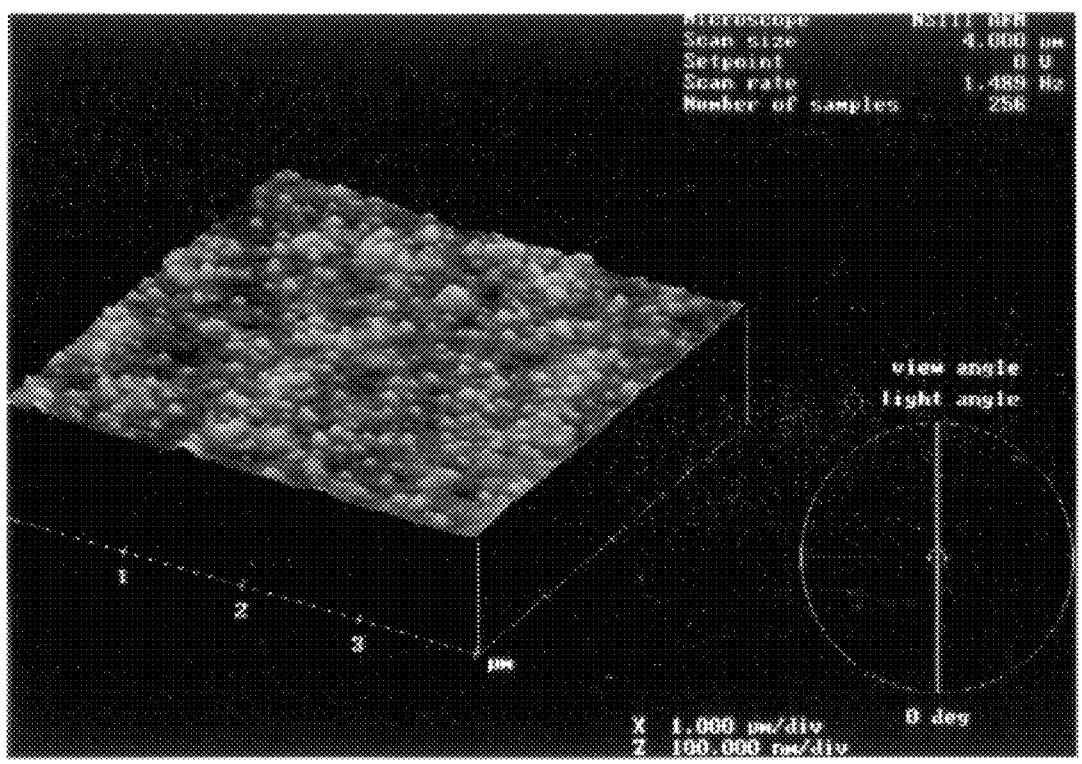
FIG. 6 is an atomic force micrograph (AFM) illustrating the surface texture and structure of Sample K which was cerammed with a 800° C.—2 hrs./1000° C.—4 hrs. ceramming schedule.
Figure 7:
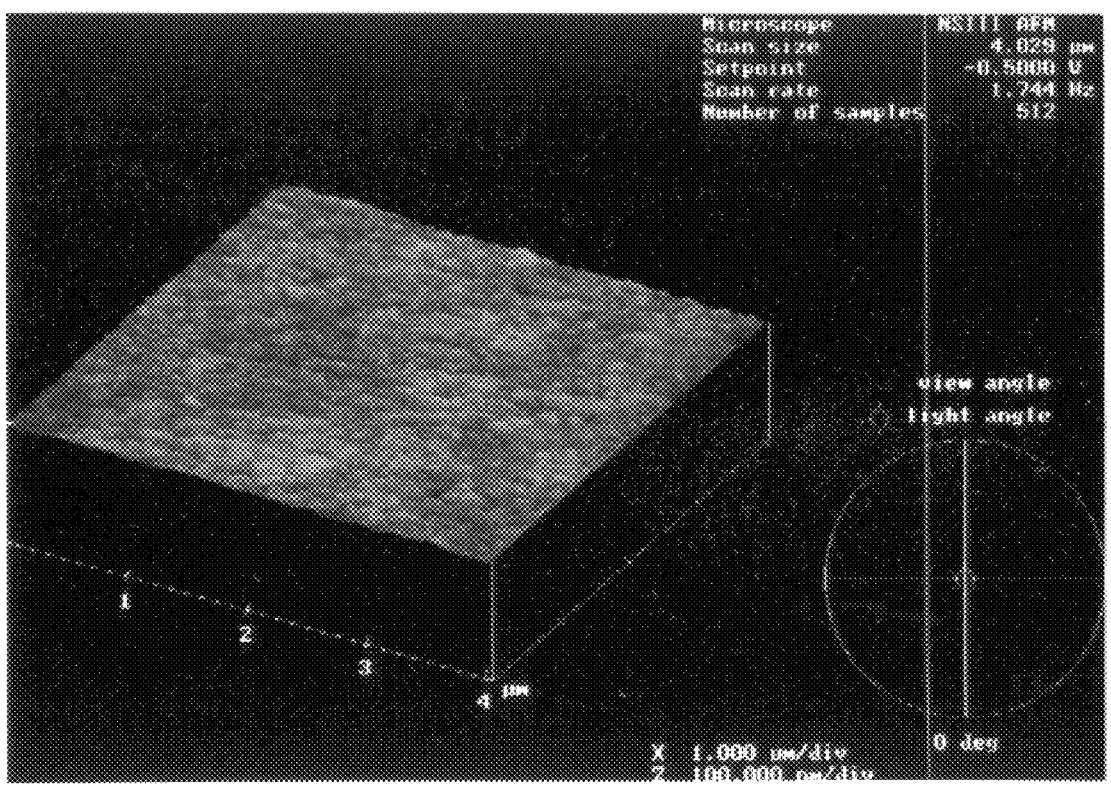
FIG. 7 is an atomic force micrograph (AFM) illustrating the surface texture and structure of Sample A which was cerammed with Schedule 1.

The surface texture and crystalline structures of the invention where examined by various means after the test samples received a traditional glass-ceramic information disk substrate finishing treatment of lapping with 7 μm alumina slurry, then polishing with a 1.5 μm alumina polishing slurry at 2–3 psi. FIGS. 6 and 7 are atomic force micrographs (AFM) at the same scale with the Z axis set at 100.000 nm which were obtained in the contact mode on a NanoScope III model, manufactured by Digital Instruments Inc. of Santa Barbara, Calif. FIG. 6 illustrates the crystalline surface texture structure of Sample K which was cerammed with an 800° C.—2 hour/1000° C.—4 hour ceramming schedule. FIG. 7 illustrates the crystalline surface texture structure of Sample A which was cerammed with an 800° C.—2 hour/925° C.—4 hour ceramming schedule. FIGS. 6 and 7 show the unique surface textures that may be obtained with the compositional and ceramming schedule ranges of the invention. Variations of the inventive compositions and heat treatments allow for a range of mean roughness from approximately 0.5 to 2.0 nm. A comparison of FIG. 6, which discloses a relatively rough surface texture, with the fine surface texture of FIG. 7 shows the variations of the invention which may be utilized in the manufacture of information disk substrates depending on specific surface texture requirements.

Figure 8:
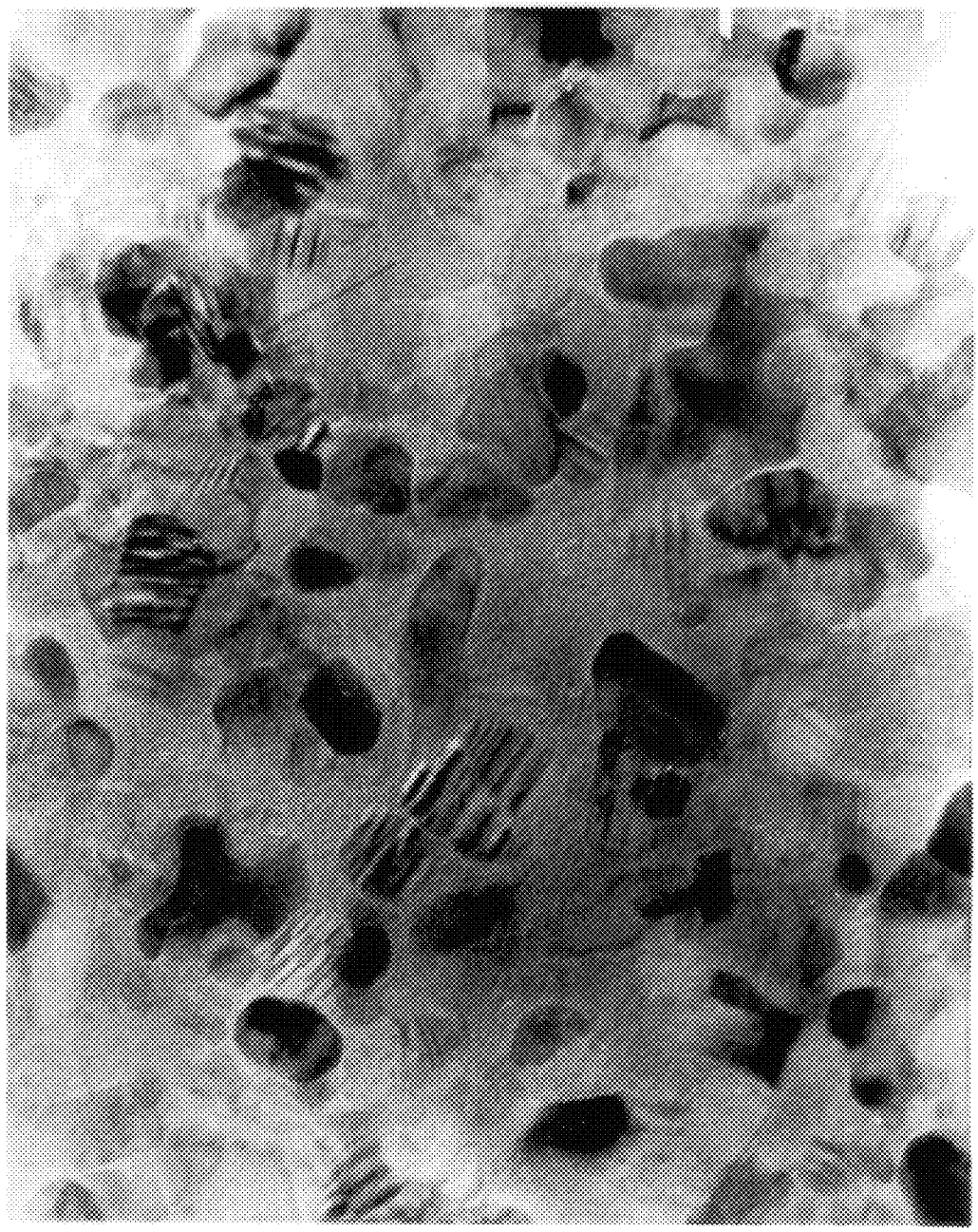
FIG. 8 is a transmission electron micrograph (TEM) at 400,000× magnification showing the crystalline structure and arrangement of Sample K which was cerammed with Schedule 5.

FIG. 8 is a transmission electron micrograph (TEM) at 400,000× magnification showing a further magnified view of the crystalline structure and arrangement of Sample K which was cerammed with Schedule 5. It is believed that many of the crystals in FIG. 11 exhibit lamellar or reflection twinning which is indicative of enstatite. The TEM was obtained using a Model JEM 2000 FX, Electron Microscope manufactured by the JEOL Corporation of Japan. In the bottom left corner of the figure is a measurement key showing 0.1 μ(m).

The information disk substrate glass-ceramic of this invention is superior to other glass-ceramic materials such as those disclosed in co-pending U.S. patent application Ser. No. 08/415,791, in that the glass-ceramic substrate of the present invention can be finished to desired surface requirements in a significantly shorter time while using conventional lapping and polishing methods. The preferred composition of this invention polishes significantly faster than the examples of application Ser. No. 08/415,791. Also conventional and softer abrasives such as cerium oxide may be used with the present invention but are difficult to use with many other glass-ceramics. The preferred information disk composition of sample K of the present invention polished in less than half the polishing time of spinel based glass-ceramic substrates.

Additionally applicants' present invention composition is alkali free which is important for a glass ceramic substrate material that will be coated with a magnetic coating.

We claim:

1. A glass-ceramic having a primary crystal phase that has a diffraction pattern indicative of the same crystalline structure as hexacelsian, except for a shift in the diffraction line at approximately 22 degrees 2 θ, said glass-ceramic exhibiting a stabilized thermal expansion such that the thermal expansion vs. temperature curve does not have a slope change or hook that is characteristic of hexacelsian between the temperature of 200 and 800° C., the primary crystal phase being hexacelsian solid solution and the glass-ceramic having a composition consisting essentially of, in weight % on an oxide basis, 40–50% $SiO_2$, 8–20% $Al_2O_3$, 10–24% MgO, 8–22% BaO, 8–12% $TiO_2$ and 0–3% ZnO.

2. The glass-ceramic of claim 1 wherein $Mg^{+2}$, $Zn^{+2}$, $Ti^{+3}$, $Ti^{+4}$, $Zr^{+4}$ ions or a combination thereof, substitutes for some $Ba^{+2}$ and/or $Al^{+3}$ in the hexacelsian crystal structure.

3. The glass-ceramic of claim 1 wherein said glass-ceramic has a thermal expansion curve that is a straight line between 200 and 800° C.

4. The glass-ceramic of claim 1, said glass-ceramic having a secondary crystal phase structure of enstatite.

5. The glass-ceramic of claim 1 wherein said glass-ceramic is alkali free.

6. The glass-ceramic of claim 1 wherein said glass-ceramic article is the material of magnetic memory disk substrate.

7. The glass-ceramic of claim 1, wherein, during heating or cooling between 200 and 800° C., the glass-ceramic is free of any resultant, instantaneous increase in volume change due to a phase transformation.

* * * * *